United States Patent [19]
Williams

[11] Patent Number: 5,968,151
[45] Date of Patent: Oct. 19, 1999

[54] SYSTEM AND METHOD OF POSITIVELY DETERMINING ISA CYCLE CLAIMING

[75] Inventor: Mark Williams, San Jose, Calif.

[73] Assignee: OPTi, Inc., Milpitas, Calif.

[21] Appl. No.: 08/770,945

[22] Filed: Dec. 31, 1996

[51] Int. Cl.⁶ .................................................. G06F 13/00
[52] U.S. Cl. .......................... 710/100; 710/101; 710/107; 710/126; 710/128; 710/36
[58] Field of Search ..................... 395/280, 306, 395/307, 308, 281, 287, 856; 710/100, 126, 127, 128, 101, 107, 36

[56] References Cited

U.S. PATENT DOCUMENTS

| | | | |
|---|---|---|---|
| 5,533,204 | 7/1996 | Tipley | 395/288 |
| 5,568,621 | 10/1996 | Wooten | 395/292 |
| 5,621,900 | 4/1997 | Lane et al. | 395/300 |
| 5,715,411 | 2/1998 | Verdun | 395/309 |
| 5,724,529 | 3/1998 | Smith et al. | 395/306 |
| 5,781,748 | 7/1998 | Santos et al. | 395/308 |

*Primary Examiner*—Glenn A. Auve
*Assistant Examiner*—Ario Etienne
*Attorney, Agent, or Firm*—Fliesler, Dubb, Meyer & Lovejoy

[57] ABSTRACT

A system and method in accordance with the invention permits the full support of two ISA buses, a local ISA bus and a second ISA bus. To do so, upon receiving an access cycle, the cycle is directed to the second ISA bus. The second ISA bus is monitored for a signal event which indicates that an ISA device is claiming the cycle. If the signal event does not occur, the cycle is directed to the local ISA bus.

21 Claims, 3 Drawing Sheets

SYSTEM AND METHOD OF POSITIVELY DETERMINING ISA CYCLE CLAIMING

BACKGROUND OF THE INVENTION

1. Field of Invention

The invention is related to the direction of access cycles to various buses in a multi-bus system.

2. Background Art

The IBM PC AT computer architecture has become industry standard architecture for personal computers, and is typically built around a CPU such as an 80286, 80386, 80486, or 80586 (Pentium®) microprocessor manufactured by Intel Corporation. The CPU is coupled to a host (local) bus, capable of performing memory accesses and data transfers at high rates of speed (i.e., on the order of 10–66 MHz;). The host bus generally includes 16, 32, or 64 data lines, a plurality of address lines, and various control lines. For present purposes the following signals on the host bus are important:

| Signal Name | Signal Description |
|---|---|
| HD[63:0] | Host Bus Data Lines. |
| HA[31:3] | Host Bus Address Lines. |
| BE[7:0]# | Byte enables 7 through 0: Selects the active byte lanes on HD[63:0]. |
| INTR | Interrupt Request: INTR is driven to signal the processor that an interrupt request is pending and needs to be serviced. |
| M/IO# | Memory/Input-Output: M/IO# defines processor bus cycles along with D/C#, and W/R#. |
| D/C# | Data/Control: D/C# defines processor bus cycles along with M/IO# and W/R#. |
| W/R# | Write/Read: W/R# defines processor bus cycles along with M/IO# and D/C#. |
| ADS# | Address Strobe: The processor asserts ADS# to indicate that a new bus cycle is beginning |
| BRDY# | Burst Ready: BRDY# indicates that the system has responded in one of three ways: 1) Valid data has been placed on the processor data bus in a response to a read, 2) Processor write data has been accepted by the system, or 3) the system has responded to a special cycle. |
| STPCLK# | Stop Clock: this signal is connected to the STPCLK# input of the processor. It causes the processor to get into the STPGNT# state. |

The typical IBM PC AT-compatible computer also includes a system bus, sometimes referred to as an I/O bus. Such a system bus is used to interface communications between a host CPU and a peripheral device, or communications between peripheral devices and host memory. The system bus is coupled to the host bus via certain interface circuitry. The system bus includes generally 8, 16, or 32 data lines, a plurality of address lines, as well as control/status lines. One of the most commonly used system buses is the industry standard architecture (ISA) bus. The ISA bus was adopted by several computer industry groups in the 1980's to create a standard to permit the development of compatible add-on cards in a reasonable and consistent fashion. The ISA bus operates at approximately 8 Mhz and includes 8 or 16 data lines, distinct address lines, as well as distinct control and command lines.

The various signals on the ISA bus are well specified and known in the industry. General information on the ISA bus can be found in Solari, "AT Bus Design" (San Diego, Annabooks, 1990), incorporated by reference herein. For present purposes, the following ISA signals are important:

| Signal Name | Signal Description |
|---|---|
| SA[23:0] | 24 address lines. |
| BALE | Bus address latch enable line. BALE is an active high signal asserted to indicate when the SA address, AEN and SBHE# lines are valid. BALE remains asserted throughout ISA master and DMA cycles. |
| SBHE# | System byte high enable. When SBHE# is active, it indicates that a byte is being transferred on the upper byte (SD[15:8]) of the data bus. |
| AEN | Address enable line. AEN is asserted during DMA cycles to prevent I/O slaves from misinterpreting DMA cycles as valid I/O cycles. When active, AEN informs I/O resources on the ISA bus that a DMA transfer is occurring. |
| SD[15:0] | 16 data lines. |
| MEMR# | Read request lines to a memory resource on the ISA bus. |
| MEMW# | Write request lines to a memory resource on the ISA bus. |
| IOR# | Read request line to an I/O resource on the ISA bus. Also called IORC# or IORD#. |
| IOW# | Write request line to an I/O resource on the ISA bus. Also called IOWC# or IOWR#. |
| M16# | Memory chip select 16. Asserted by an addressed memory resource on the ISA bus if the resource can support a 16-bit memory access cycle. Also called MEMSC16#. |
| IO16# | I/O chip select 16. Asserted by an addressed I/O resource on the ISA bus if the resource can support a 16-bit I/O access cycle. Also called IOCS16#. |
| NOWS# | Synchronous Ready line. Also sometimes called 0WS#, SRDY# or ENDXFR#. Activated by an addressed memory resource to indicate that it can support a shorter-than-normal access cycle. |
| IOCHRDY | I/O channel ready line. If this line is deactivated by an addressed I/O resource, the cycle will not end until it is reactivated. Also sometimes called CHRDY. |
| IRQ(15, 14, 12:9, 7:3) | Interrupt request lines to interrupt controller for CPU. |
| DMARQ (7:5, 3:0) | DMA Request lines from I/O resource on ISA bus. |
| DACK(7:5, 3:0) | DMA Acknowledge lines. |
| BCLK | ISA bus clock signal. |

Recently, efforts have been made to develop other bus protocols for PC AT-compatible computers with the goals of reducing the size of PC AT-compatible computers as well as continued industry standardization. These efforts have included the development of the PCI bus, which has been developed to establish a new industry standard for bus architectures, particularly those interfacing with high bandwidth functions. The PCI bus is described in detail in "PCI Local Bus Specification", Revision 2.1 (Portland, Oreg., PCI Special Interest Group, 1995), incorporated by reference herein. For present purposes, the following PCI signals are important:

| Signal Name | Signal Description |
| --- | --- |
| AD[31:0] | PCI Address and Data: AD[31:0] are bidirectional address and data lines for the PCI bus. |
| FRAME# | Cycle Frame: FRAME# is driven the current bus master to indicate the beginning and duration of an access. FRAME# is asserted to indicate that a bus transaction is beginning. While FRAME# is asserted, data transfers continue. When FRAME# is deasserted, the transaction is in the final data phase or has completed. |
| IRDY# | Initiator Ready: IRDY# indicates the initiating agent's (the bus master's) ability to complete the current data phase of the transaction. IRDY# is used in conjunction with TRDY#. A data phase is completed on each clock that both IRDY# and TRDY# are sampled asserted. During a write, IRDY# indicates that valid data is present on AD[31:0]. During a read, it indicates the master is prepared to accept data. |
| TRDY# | Target Ready: TRDY# indicates the target agent's (selected device's) ability to complete the current data phase of the transaction. TRDY# is used in conjunction with IRDY#. A data phase is asserted. During a read, TRDY# indicates that valid data is present on Ad[31:0]. during a write, it indicates the TRDY# is proper. |
| DEVSEL# | Device Select: When actively driven, DEVSEL# indicates the driving device has decoded its address as the target of the current access. |
| STOP# | Stop: STOP# indicates that the current target is requesting a master to stop the current transaction. |
| PCICLK | Master PCI clock. |
| CLKRUN# | Clock Run: CLKRUN# is an I/O sustained tristate signal used by the central resource (the host) to request permission to stop or slow the PCICLK. |

Despite PCI bus development, because the PCI bus was designed primarily to support high-end peripherals (i.e., supporting speeds of up to 66 Mhz for 64-bit data), it is not as economical to manufacture low-end peripherals for the PCI-bus as it is for the older and slower ISA-bus. Thus both PCI-type devices and ISA-type devices are commonly produced and computer systems must be developed which have the interfaces to support both PCI-type and ISA-type devices.

Generally, in performing a read or write access to a system bus device, the host processor typically initiates an I/O access cycle by asserting M/IO#, W/R#, D/C#, and an I/O address. System interface circuitry recognizes the I/O signals generated by the host processor, performs the desired operation over the system bus, and if appropriate, returns results to the host processor over the host bus.

When the system bus is an ISA bus and when the interface circuitry receives an access cycle initiated by the host processor, the interface circuitry merely directs the cycle onto the ISA bus. The target devices on the ISA bus will decode the address asserted, and the appropriate device (the one addressed) will claim the cycle, and then perform a data transfer.

One drawback of this ISA device bus claiming scheme, however, is that ISA devices generally give no indication to the interface circuitry, or to any other device, that they are claiming particular cycles. The ISA device simply engages in the procedure to begin transmitting or receiving data.

The PCI bus attempts to solve the addressing problems experienced with ISA buses. With the PCI bus, during an initial configuration cycle, every device on the PCI bus is first assigned a specific address range which uniquely identifies the device. Further, all address lines (AD[31:0]) on the PCI bus are coupled to every PCI device, and each device performs its own address decoding. Finally, each device on the PCI bus asserts a DEVSEL# signal, which indicates when asserted that the device is claiming the cycle.

PCI 2.1 supports two styles of address decoding: positive and subtractive. Positive decoding occurs when a device is "looking" for accesses into the address range to which it has been assigned, and is generally faster than subtractive decoding. When a device "sees" its address on the bus, i.e., when signals are asserted on the address bus indicating an address in the device's address range, the device positively claims the cycle and asserts DEVSEL#, indicating to other PCI devices that it is claiming the cycle.

Subtractive decoding occurs when a device accepts accesses which are not accepted by any other device. Thus subtractive decoding can only be performed by one device on the PCI bus. In addition, subtractive decoding is generally slower than positive decoding since it effectively gives all other devices on the bus a "right of first refusal" on each access. If a device claims a cycle by subtractive decoding, it also asserts a DEVSEL# signal, indicating to other PCI devices that it "owns" the bus, i.e., that it claims the cycle. Further details regarding addressing and address decoding on the PCI bus can be found in PCI 2.1.

Because PCI and ISA as well as other types of system buses are common, many systems are built to support multiple bussing schemes. In such multi-bus systems, when the CPU or other device initiates an I/O access cycle, the interface circuitry must direct the cycle to the appropriate bus. This type of situation has most often been handled using the positive-subtractive decode scheme of the PCI bus. For instance, upon receiving a cycle, the interface circuitry first directs the cycle to the PCI bus, where it will be positively or subtractively decoded by PCI devices. If no PCI device, including the interface circuitry, positively claims the access cycle, the cycle is subtractively claimed by the interface circuitry. The interface circuitry is thus a PCI device and further acts as the single PCI subtractive decoder on the PCI bus. The interface circuitry then directs the subtractively claimed cycle to the local ISA bus. Thus, the local ISA bus receives the cycle by default.

This system of positive and subtractive decoding has tended to work well with free-standing PC systems. Notebook computers with docking stations, however, pose a more difficult problem. Notebook computers, or other mobile devices, when standing independently, typically have a similar bus structure to a desktop system, i.e., host processor, interface circuitry, ISA bus, PCI bus, etc., and will thus operate as described above. When a notebook system is docked, or placed in a docking station, however, a second ISA bus is usually linked to the notebook system. I/O cycles initiated from the host processor (on the notebook) must then be identified by the interface circuitry as destined for the ISA bus local to the notebook system (the "local ISA bus"), the PCI bus, or the remote ISA bus accessed through the docking station.

The presence of a remote ISA bus will raise several problems. First, remote ISA devices can claim the same address ranges as local ISA devices and therefore a bus conflict can result, particularly when both devices are trying to put data onto the bus for a read cycle. Second, the remote ISA devices, like their local ISA counterparts, still do not acknowledge that they are claiming a particular cycle. Therefore, if a cycle is directed to the remote ISA bus and the cycle is not claimed by a remote ISA device, the computer system may be significantly slowed.

The solution to these problems which is generally practiced is that for various more permanent local ISA resources (e.g., ROM, KBC, RTC) whose I/O addresses are known at manufacturing time, the known addresses are stored in registers in the interface circuitry. When a cycle directed to the PCI bus is ultimately destined for a local permanent ISA device address, the interface circuitry is programmed to positively claim the cycle when the cycle is on the PCI bus and then to direct the cycle to the local ISA bus. Otherwise the cycle is directed to the remote ISA bus. While this scenario aids in avoiding conflict with known local devices, it does not overcome the problematic situation where additional ISA devices (add-on cards) are added to the local ISA bus. Identifying which ISA bus a cycle should be directed to is usually a guessing game at best and can lead to bus conflict situations. Therefore, because conventionally there has not been a good way to determine when an ISA device is claiming a cycle, most designers minimize use of ISA devices.

Thus, it is desirable to develop a system which can recognize when a device on a second ISA bus claims a cycle, allowing bus conflicts to be minimized.

SUMMARY OF INVENTION

In order to avoid the problems of directing bus cycles to an appropriate bus when more than one ISA bus is present, the following method and system is utilized. In a system having a local ISA bus and a second ISA bus, upon receiving an access cycle the cycle is directed to the second ISA bus. The second ISA bus is monitored to positively determine if a device on the second ISA bus claims the cycle. In one embodiment, the ISA bus is monitored for the occurrence of a signal event which includes one of the assertion of M16#, the assertion of IO16#, the assertion of NOWS#, the deassertion of IOCHRDY, or the assertion of any of the data lines in a low state. If the signal event does not occur, then the cycle is directed to the local ISA bus.

Other embodiments of the invention also include a PCI bus. In embodiments with a PCI bus, an access cycle is first directed to the PCI bus. If not positively claimed by a PCI device on a fast or medium decode clock, the cycle is positively claimed and directed to the second ISA bus on a slow decode clock. The second ISA bus is monitored for a signal event indicating an ISA device claims the cycle. If the signal event does not occur, the cycle is directed to the local ISA bus through subtractive decoding.

A system and method in accordance with the invention is advantageous in that full support for two ISA buses can be had, eliminating the need to restrict designs to accommodate two ISA buses.

BRIEF DESCRIPTION OF THE FIGURES

The present invention is described with respect to particular exemplary embodiments thereof and reference is accordingly made to the drawings (which are not necessarily drawn to scale), wherein like reference numbers denote like parts, in which.

DETAILED DESCRIPTION

Figure 1:
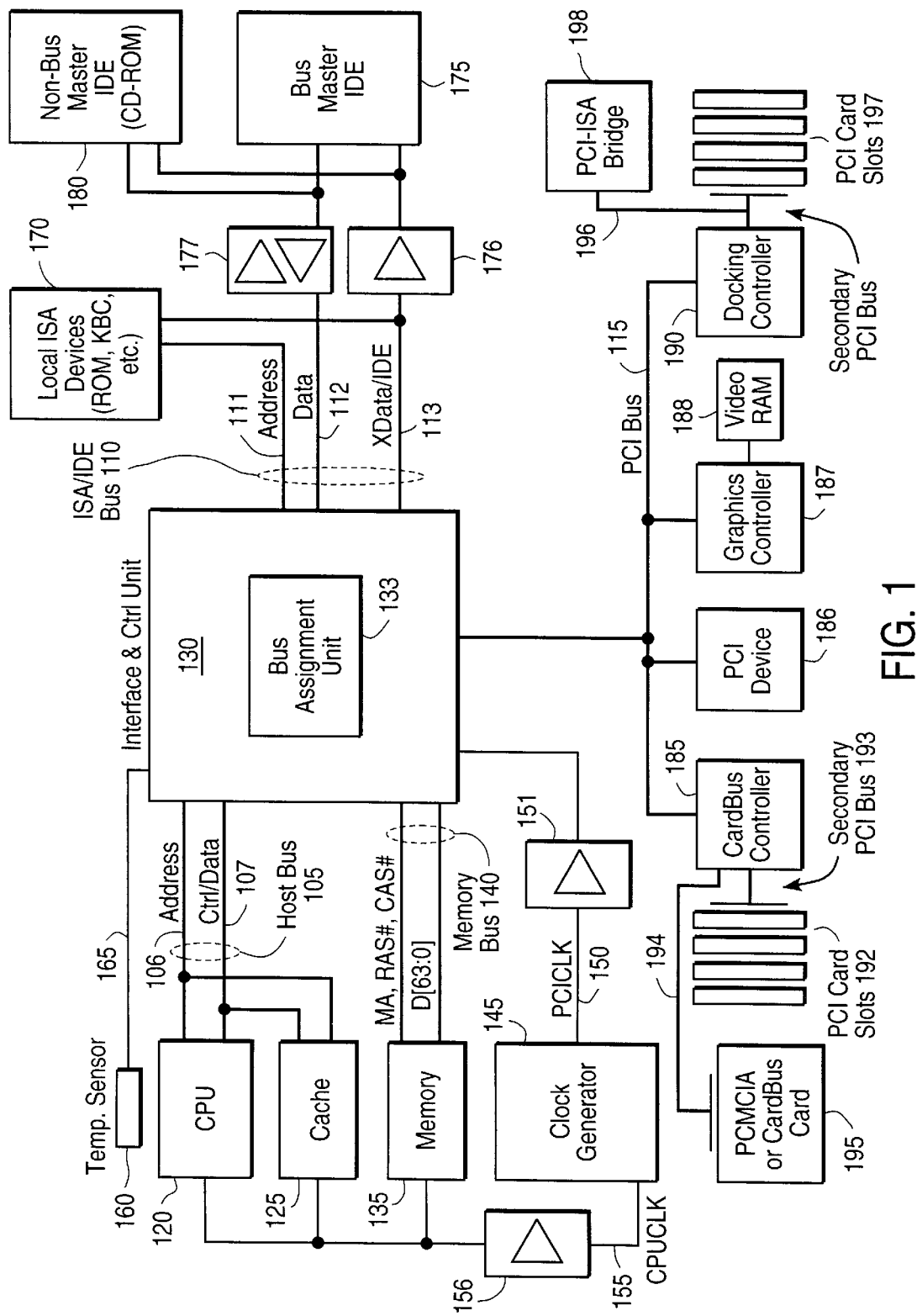
FIG. 1 is a schematic block diagram of a system which utilizes an embodiment of the invention.

A system 100 which may incorporate the present invention is shown in FIG. 1. It comprises a host bus 105, an ISA bus 110, and a primary PCI bus 115.

The host bus 105 includes address lines 106 and control/data/status lines 107. The ISA bus 110 includes address lines 111, 16-bit data lines 112, XData lines 113, as well as various control/status lines (not shown). The primary PCI bus 115, includes address, data and control/status lines.

A processor 120 (such as Intel's 80586 Pentium®) is coupled to address, data and control/status lines of host bus 105. The address and control/status lines of host bus 105 are further coupled to cache memory 125. Cache memory 125 may be synchronous L2 (level 2) cache in one embodiment.

Host bus 105 is further coupled to interface and control unit 130. Interface and control unit 130 includes bus assignment unit 133. In one embodiment, interface and control unit 130 is a chipset.

Interface and control unit 130 is coupled to memory unit 135 via memory bus 140 which provides memory address, RAS#, CAS#, and data information between interface and control unit 130 and memory unit 135. Memory unit 135 may be composed of EDO or synchronous DRAM in various embodiments.

Clock generator unit 145 provides a PCI clock signal (PCICLK) on line 150 via buffer 151 to interface and control unit 130. Clock generator unit 145 further provides a CPU clock signal (CPUCLK) on line 155 via buffer 156 to memory unit 135, if synchronous DRAM is used, and to processor 120.

Temperature sensor circuit 160 is coupled to interface and control unit 130 via line 165.

Several devices are coupled to interface and control unit 130 via ISA bus 110. These devices include local ISA devices 170, such as BIOS ROM, keyboard controller (KBC), etc. Further, bus mastering IDE devices 175 as well as non-bus mastering IDEs 180 (such as CD-ROM) are coupled to interface and control unit 130 via ISA bus 110, buffer 176 and bidirectional transceiver 177.

PCI bus 115 is also coupled to interface and control unit 130. Several devices are coupled to PCI bus 115, including a cardbus controller 185, which may be an 82C824 produced by OPTi, Inc. of Milpitas, Calif., a graphics controller 187, which may be a 92C178, produced by OPTi, Inc., and a docking controller 190, which may be an 82C814 produced by OPTi, Inc. Coupled to graphics controller 187 is video RAM card 188. Other PCI devices 186, such as a PCI-based super I/O unit, may also be coupled to PCI bus 115 in various embodiments.

One limitation of the PCI bus is that, although it is high speed, it has limited load capability. As a general rule, the PCI bus can support only ten load units. If more PCI devices are required above and beyond ten, a bridge, which itself counts as a load unit, must be utilized on the primary PCI bus to connect a secondary PCI bus. On the other side of the bridge, an additional ten more load units can be added. Thus, in FIG. 1, CardBus controller 185 acts as a bridge to secondary PCI bus 193. Secondary PCI bus 193 couples additional PCI slots 192 to the system. Additionally, Card-Bus controller 185 can also be coupled via line 194 to a PCMCIA or other CardBus card 195.

In like manner, docking controller 190 is coupled to a secondary PCI bus 196, which couples additional PCI slots 197 to the system. In one embodiment of the invention, docking controller 190 is further coupled to a PCI-to-ISA bridge 198, which will link system 100, when inserted into a docking station, to a remote ISA bus, which in turn will be coupled to additional ISA devices.

In order to alleviate problems of directing cycles to their appropriate destinations introduced by devices on a second or remote ISA bus, or by other devices which do not acknowledge the claiming of a cycle, the following system has been developed.

Figure 2:
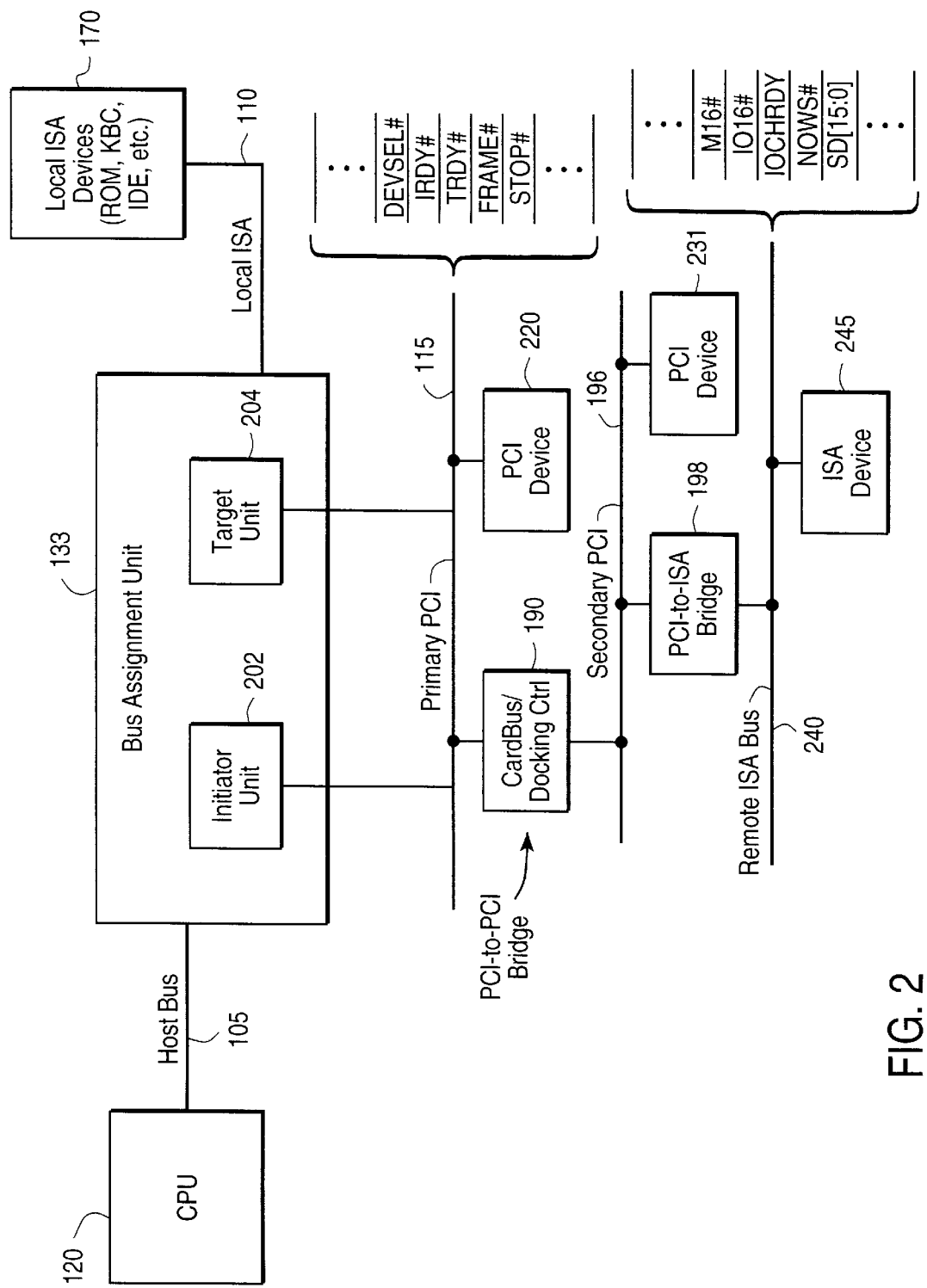
FIG. 2 is a schematic block diagram of a system in accordance with the invention.

Referring to FIG. 2, processor 120 is coupled to bus assignment unit 133 via host bus 105. Bus assignment unit 133 includes initiator unit 202 and target unit 204. Initiator unit 202 and target unit 204 are each coupled to primary PCI bus 115. Primary PCI bus 115 may, in various embodiments, be coupled to several PCI devices 220. However, because the PCI bus is only designed for a limited load, a secondary PCI bus 196 is utilized, coupled to the primary PCI bus 115 by a PCI-to-PCI bridge 190. In one embodiment of the invention PCI-to-PCI bridge 190 is a 82C824 CardBus Controller produced by OPTi, Inc. In another embodiment of the invention, PCI-to-PCI bridge 190 is an 82C814 Docking Controller, also produced by OPTi, Inc.

As shown in FIG. 2, secondary PCI bus 196 may be coupled, in various embodiments, to one or more PCI devices 231. Secondary PCI bus 196 is also coupled in one embodiment to a PCI-to-ISA bridge 198, which in turn is coupled to a remote ISA bus 240. In one embodiment such coupling between PCI-to-ISA bridge 198 and remote ISA bus 240 is the result of docking a mobile (e.g., a notebook) computer system in a docking station. Remote ISA bus 240 is further coupled to one or more ISA devices 245.

When an access cycle is initiated by processor 120 or other bus-owning device, bus assignment unit 133, through initiator unit 202, directs the access cycle to the PCI bus. If within a specified time the DEVSEL# line is asserted by a PCI device, then a PCI device has positively claimed the cycle. The specified time period for one embodiment of the invention is three clock cycles (often referred to as fast, medium, and slow decode clocks). If no PCI device positively claims the cycle in the specified time period, then the cycle is subtractively decoded and claimed by the target unit 204 of bus assignment unit 133. In one embodiment of the invention, subtractive decoding occurs on a clock cycle (referred to as a "subtractive decode clock") following a slow decode clock. The bus assignment unit 133 subsequently directs the cycle to the local ISA bus. Thus, the local ISA bus is the "default" bus for all unclaimed cycles.

To handle a remote ISA bus 240, which is coupled to a PCI bus 196 through a PCI-to-ISA bridge 198, cycles which may be destined for the remote ISA bus 240 are positively claimed on a slow decode clock by the PCI-to-PCI bridge 190. That is, if the cycle is not claimed as the fast or medium decode clock by another PCI device, the PCI-to-PCI bridge 190 is programmed and/or designed to positively accept cycles in an address range which includes the addresses for remote ISA devices, e.g., generally addresses in a range of less than 16 MB for memory devices and less than 64 KB for I/O devices. During an initial configuration cycle which determines device address ranges, the secondary PCI bus 196 and other PCI buses are enumerated, as is known in the art, allowing for the determination of address ranges which may be accepted by the PCI-to-PCI bridge 190. Once the cycle is directed to secondary PCI bus 196, the PCI-to-ISA bridge 198 will claim addresses generally assigned to ISA devices, although it will be unable to determine if devices claiming those addresses are actually present on the bus.

Thus to summarize, for certain address ranges, including ISA addresses, a cycle on primary PCI bus 115 is claimed on a slow decode clock by PCI-to-PCI bridge 190. PCI-to-PCI bridge 190 then directs the cycle to the secondary PCI bus 196. Cycles on secondary PCI bus 196 specifying an ISA address range are claimed by the PCI-to-ISA bridge 198. PCI-to-ISA bridge 198 then directs the cycle to remote ISA bus 240.

While waiting to determine if a remote ISA bus claims the cycle, the PCI-to-PCI bridge 190 asserts retries to the bus assignment unit 133. A retry refers to a type of access cycle termination request by a target device where such request occurs before any data is transferred because the target is busy or unable to process the transaction. A retry indicates, however, that the master asserting the cycle should subsequently repeat the same request until the transaction completes. Retries are useful to avoid blocking the entire PCI bus while the slave device retrieves data. The target device signals a retry by asserting a STOP# signal on the PCI bus 115 and does not assert the TRDY# signal (on PCI bus 115) on the initial data phase of the transaction. More detailed information regarding retries can be found in PCI 2.1.

Figure 3:
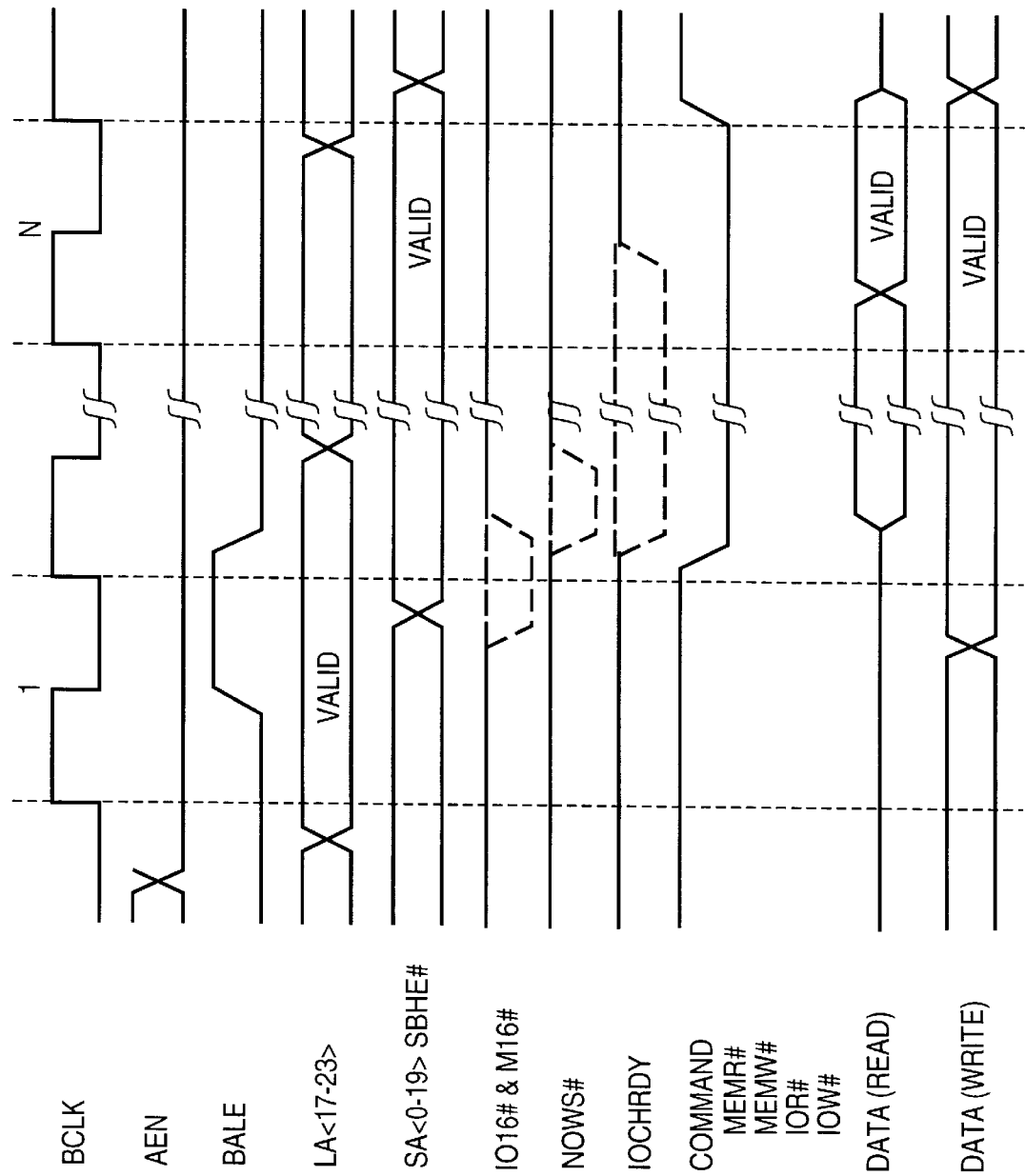
FIG. 3 is a generic ISA timing diagram.

Once claimed by PCI-to-ISA bridge 198, the PCI-to-ISA bridge 198 directs the cycle onto remote ISA bus 240. Typical ISA cycle timing for 16-bit devices and 8-bit devices is shown in FIG. 3 where an underlined signal indicates its availability only for 16-bit devices. ISA devices are not inherently provided with a method to acknowledge the claiming of a cycle. However, as shown in FIG. 3, if an ISA device is claiming a cycle and if it is a 16-bit device, it must assert M16# or IO16# on the ISA bus. Therefore, the PCI-to-ISA bridge 198 can positively determine a claimed ISA cycle when M16# or IO16# are asserted.

If, however, the ISA device is an 8-bit device, the M16# and IO16# signals are not used. Instead, a device in accordance with the invention monitors the IOCHRDY and NOWS# signals on the ISA bus. If an ISA device is claiming the cycle, generally either IOCHRDY will be deasserted or NOWS# will be asserted, and a cycle can be identified as positively claimed for 8-bit devices in most instances by monitoring these signals.

If any of the described signal events occur (assertion of M16#, IO16#, NOWS#, or deassertion of IOCHRDY), then the cycle is identified as positively claimed and the cycle is completed on the secondary PCI bus 525 by the PCI-to-ISA bridge 198. The PCI-to-PCI bridge 190 finishes out the next retried cycle on the primary PCI bus 115.

If none of the specified signal events occurs within a designated time frame (e.g., six clock cycles), then if the cycle is a write cycle, a Target-Abort is generated from the PCI-to-ISA bridge 198 to the PCI-to-PCI bridge 190, indicating that the PCI-to-ISA bridge 198 could not conclusively determine that an ISA device accepted the cycle. A Target-Abort is an access cycle termination request specified in PCI 2.1 that generally indicates either a fatal error to the access cycle or that the target device will be unable to complete the access request. A Target-Abort is indicated by the target device deasserting DEVSEL# and asserting STOP# simultaneously. Further details relating to Target-Aborts can be found in PCI 2.1.

After a Target-Abort is generated by PCI-to-ISA bridge 198, the PCI-to-PCI bridge 190 is designed to ignore the next retried cycle generated from the initiator unit 202 of bus assignment unit 133 on the primary PCI bus 115. Since no PCI device claims the cycle on the fast, medium, or slow decode clocks of the retried and ignored cycle, the target unit 204 of bus assignment unit 133 then subtractively claims the cycle on the primary PCI bus 115 and directs the cycle to the local ISA bus 110.

Even if a remote ISA device 245 did claim a write cycle and the PCI-to-ISA bridge 198 could not conclusively so determine (e.g., by identifying one of the specified signal events), then a write cycle may occur on both ISA buses. Generally, writing to devices on both ISA buses is not problematic and thus this situation is not of great concern. In the case of a read cycle, however, a conflict could result if two devices attempt to assert valid read data.

Therefore, if the cycle is a read cycle and none of the above-described signal events occur indicating a claimed cycle, and if SD[7:0]=FF (the low 8-bit data lines are pulled high) on remote ISA bus 240, then a Target-Abort is generated as described above for a write cycle. However, if SD[7:0] is equal to anything other than FF, then the PCI-to-ISA bridge 1913 will positively identify the cycle as being claimed by an ISA device because read data is being placed on the bus by an ISA device 245. Only the low order data bits of the remote ISA bus are monitored because neither M16# nor IO16# were sampled active indicating that the device is not a 16-bit device.

Even if an FF value on lines SD[7:0] is valid read data, and the PCI-to-ISA bridge 198 generates a Target-Abort, valid read data will still be obtained. The cycle will be subtractively claimed by the target unit 204 of bus assignment unit 133 and then tried on local ISA bus 110. No device 170, however, on the local ISA bus 110 will respond. Nonetheless, the data lines on the local ISA bus 110 are required to be pulled high with pull-up resistors. Therefore, an FF value will still be read from the local ISA bus 110 and will be the same data as was asserted on the remote ISA bus 240.

In the embodiment described above, known and permanent local platform ISA resources (such as BIOS, KBC, RTC, etc.) are handled the same as are other ISA devices. That is, the cycle is tried on the PCI bus 115, tried on the remote ISA bus 240, and then directed to the local ISA bus 110 by default where a local ISA device can claim the cycle. In this embodiment, it is not necessary to pre-identify and store the addresses of local ISA devices.

In an alternative embodiment of the invention, the addresses of local known ISA resources can be stored in a register and the target unit 204 of bus assignment unit 133 can be programmed to positively claim the cycle when tried on the primary PCI bus 115. In this manner, the cycle need not be claimed by the PCI-to-PCI bridge 190 and eventually tried on the remote ISA bus 240, but can be immediately directed to the local ISA bus 110.

Thus a system and method for supporting a second ISA bus has been disclosed. The system and method allow for positively identifying when a remote ISA device has claimed an access cycle and thus can avoid bus conflicts and guessing as to which ISA bus the cycle is addressed. Further, the system is advantageous in that it can accomplish the above tasks within the confines of PCI 2.1.

It should be understood that the particular embodiments described above are only illustrative of the principles of the present invention, and various modifications could be made by those skilled in the art without departing from the scope and spirit of the invention. For instance, while the embodiments above are discussed in the context of notebook computers and "remote" ISA buses, it is to be understood that the invention could be used in any system where more than one ISA (or other non-acknowledging bus) are present. Thus, the scope of the present invention is Limited only by the claims that follow.

What is claimed is:

1. A method of directing access cycles in a computer system having a first ISA bus and a second ISA bus, comprising the steps of:
   receiving an access cycle;
   directing said access cycle to said second ISA bus;
   after said step of directing, positively determining if a device on said second ISA bus claims said access cycle.

2. The method of claim 1, wherein said step of positively determining if a device on said second ISA bus claims said access cycle includes monitoring for a signal event.

3. The method of claim 2, further comprising the step of:
   passing said access cycle to said first ISA bus upon the non-occurrence of said signal event.

4. The method of claim 3, further comprising the steps of:
   directing said access cycle to a PCI bus, before said step of directing said access cycle to said second ISA bus.

5. A method of directing access cycles in a computer system having a first ISA bus, a second ISA bus, and a PCI bus, comprising the steps of:
   receiving an access cycle;
   directing said access cycle to said PCI bus;
   claiming, by a PCI device, said access cycle;
   directing by said PCI device, said access cycle to said second ISA bus;
   after said step of directing said access cycle to said second ISA bus, positively determining, by said PCI device, if a device on said second ISA bus claims said access cycle.

6. The method of claim 5, wherein said step of positively determining, by said PCI device, if a device on said second ISA bus claims said access cycle includes monitoring for a signal event.

7. The method of claim 6, wherein the step of monitoring for a signal event includes:
   monitoring for the assertion of an IO16# signal;
   monitoring for the assertion of an M16# signal;
   monitoring for the assertion of a NOWS# signal;
   monitoring for the deassertion of an IOCHRDY signal; and
   monitoring for data which includes at least one asserted low signal.

8. The method of claim 6, further comprising the steps of:
   generating, by said PCI device, a Target-Abort upon a non-occurrence of said signal event; and,
   directing said access cycle to said first ISA bus.

9. The method of claim 5, wherein said PCI device is a PCI-to-ISA bridge on a second PCI bus, and further including the steps of:

claiming by a PCI-to-PCI bridge said access cycle, prior to said step of claiming, by a PCI device, said access cycle; and directing, by said PCI-to-PCI bridge, said access cycle to said second PCI bus.

10. The method of claim 9, wherein said step of positively determining, by said PCI device, if a device on said second ISA bus claim said access cycle includes monitoring for a signal event.

11. The method of claim 10, further comprising the steps of:

generating, by said PCI device, a Target-Abort upon a non-occurrence of said signal event;

ignoring, by said PCI-to-PCI bridge, a retried access cycle upon receipt of said Target-Abort; and directing said access cycle to said first ISA bus.

12. A system for directing access cycles, comprising:

a first ISA bus;

a PCI bus;

an interface, coupled to said PCI bus and to said first ISA bus, said interface coupled to receive access cycles and to direct said access cycles to said PCI bus; and a PCI-to-ISA bridge coupled to said PCI bus and capable of being coupled to a second ISA bus, said PCI-to-ISA bridge designed to claim an access cycle in an ISA address range, and designed to positively determine if a device on said second ISA bus claims said access cycle after said PCI-to-ISA bridge has claimed said access cycle.

13. The system of claim 12, wherein said PCI-to-ISA bridge is designed to positively determine if a device on said second ISA bus claims said access cycle by monitoring for a signal event.

14. The system of claim 13, wherein said signal event includes one of the assertion of an IO16# signal, the assertion of an M16# signal, the assertion of a NOWS# signal, the deassertion of an IOCHRDY signal, and the assertion of a low signal on a data line.

15. The system of claim 13, wherein said interface is further to direct said access cycle to said first ISA bus upon a non-occurrence of said signal event.

16. The system of claim 12, wherein said PCI bus is a secondary PCI bus and wherein said interface includes:

a primary PCI bus; and a PCI-to-PCI bridge coupled to said primary PCI bus to said secondary PCI bus.

17. The system of claim 12, further including said second ISA bus.

18. The system of claim 12, wherein said second ISA bus is located on a docking station.

19. A device for determining whether an access cycle is claimed by an ISA bus, comprising:

an M16# input;

an IO16# input;

a data input;

monitoring means for determining whether an access cycle is claimed by an ISA bus by monitoring for an asserted M16# signal on said M16# input, by monitoring for an asserted IO16# signal on said IO16# input, and by monitoring for an asserted low data signal on said data input.

20. The system of claim 19, further including:

an IOCHRDY input;

a NOWS# input; and wherein said monitoring means is further for determining whether an access cycle is claimed by an ISA bus by monitoring for an asserted NOWS# signal on said NOWS# input and for monitoring for a deasserted IOCHRDY signal on said IOCHRDY input.

21. A system, comprising an ISA bus;

a PCI bus;

a bridge coupled between said PCI bus and said ISA bus, said bridge including at least one of an M16# input, an IO16# input, a data input, an IOCHRDY input and a NOWS# input, said bridge structured to assert a bus-positively-claimed indication when a signal on one of M16#, IO16#, NOWS#, or said data input is asserted or when a signal on IOCHRDY is deasserted.

* * * * *